US011861103B2

(12) United States Patent
Shiomura et al.

(10) Patent No.: US 11,861,103 B2
(45) Date of Patent: Jan. 2, 2024

(54) MITIGATION OF DISPLAY ARTIFACTS FROM BEACON SIGNALS

(71) Applicant: Synaptics Incorporated, San Jose, CA (US)

(72) Inventors: Masaaki Shiomura, Tokyo (JP); Hirokazu Hatayama, Kanagawa (JP); Makoto Takeuchi, Kanagawa (JP); Takayuki Noto, Tokyo (JP); Nobukazu Tanaka, Tokyo (JP); Daisuke Ito, Tokyo (JP); Tomohiro Hirakawa, Chiba (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/717,780

(22) Filed: Apr. 11, 2022

(65) Prior Publication Data

US 2023/0325027 A1     Oct. 12, 2023

(51) Int. Cl.
  *G06F 3/041* (2006.01)
  *G06F 3/044* (2006.01)
  *G09G 3/20* (2006.01)

(52) U.S. Cl.
  CPC ........ *G06F 3/04166* (2019.05); *G06F 3/0442* (2019.05); *G09G 3/20* (2013.01); *G09G 2310/08* (2013.01); *G09G 2330/021* (2013.01); *G09G 2340/0435* (2013.01)

(58) Field of Classification Search
  CPC ..... G06F 3/04166; G06F 3/0442; G09G 3/20; G09G 2310/08; G09G 2330/021; G09G 2340/0435
  See application file for complete search history.

(56) References Cited

U.S. PATENT DOCUMENTS

| | | | |
|---|---|---|---|
| 2012/0229419 A1* | 9/2012 | Schwartz | G06F 3/0445 345/174 |
| 2014/0038524 A1* | 2/2014 | Singh | G06F 3/03545 455/41.2 |
| 2018/0113559 A1* | 4/2018 | Bae | G06F 3/03545 |
| 2018/0217686 A1* | 8/2018 | Qiao | G06F 3/0442 |
| 2018/0335861 A1* | 11/2018 | Wu | G06F 3/03545 |

* cited by examiner

*Primary Examiner* — Gerald Johnson
(74) *Attorney, Agent, or Firm* — Leydig, Voit & Mayer, Ltd.

(57) ABSTRACT

In general, in one aspect, one or more embodiments relate to an input device that includes a proximity sensing panel including sensor electrodes, and a proximity sensing circuit. The proximity sensing circuit is configured to determine that an image refresh rate to an equal or lower frequency than a beacon signal rate. The input-display device is configured to align transmitting a beacon signal on proximity sensing panel to during non-refresh period of a display or perform an additional image refresh frame on the display panel immediately before a next Vsync signal and a corresponding non-refresh period.

20 Claims, 10 Drawing Sheets

MITIGATION OF DISPLAY ARTIFACTS FROM BEACON SIGNALS

FIELD

The disclosed technology generally relates to devices and methods for beacon artifact avoidance on the display in input-display devices.

BACKGROUND

Input-display devices adapted to both image displaying and proximity sensing are widely used as user-interfaces of electronic systems. An input-display device may include a display panel and an array of sensor electrodes disposed neighboring or integrated in the display panel. The input-display device may be configured to display an image on the display panel while sensing one or more input objects located on or near the display panel based on resulting signals received from the sensor electrodes.

One function of an input-display device is to detect and track a capacitive pen (e.g., an active stylus) in a sensing region of an input device. To detect and track capacitive pens, the input-display device transmits a beacon signal, which is used to perform synchronization between the active pen and the input-display device. However, the beacon signal may cause display artifacts in the displayed image.

SUMMARY

In general, in one aspect, one or more embodiments relate to an input device that includes a proximity sensing panel including sensor electrodes, and a proximity sensing circuit. The proximity sensing circuit is configured to receive an indication of a transition of an image refresh rate to an equal or lower frequency than a beacon signal rate, and align transmitting a beacon signal on proximity sensing panel to a non-refresh period of a display based on the transition.

In general, in one aspect, one or more embodiments relate to an input-display device that includes a display panel including source lines, a proximity sensing panel including sensor electrodes capacitively coupled to the source lines, the sensor electrodes configured to output a beacon signal, and a display driver. The display driver is configured to determine that an image refresh rate is at an equal or lower frequency than a beacon signal rate, and perform, responsive to the equal or lower frequency, an additional image refresh frame on the display panel immediately before a next Vsync signal and a corresponding non-refresh period.

In general, in one aspect, one or more embodiments relate to an input-display device that includes a display panel having source lines, a proximity sensing panel including sensor electrodes capacitively coupled to the source lines, the sensor electrodes configured to output a beacon signal, and a display driver. The display driver is configured to determine that an image refresh rate is at an equal or lower frequency than a beacon signal rate, and align a non-refresh period with transmitting the beacon signal on proximity sensing panel based on the equal or lower frequency.

Other aspects will be apparent from the following description and the appended claims.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified, and details or components omitted for clarity of presentation and explanation. The drawings and discussion serve to explain principles discussed below, where like designations denote like elements.

DETAILED DESCRIPTION

In the following detailed description of embodiments of the disclosure, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

In general, embodiments are directed to mitigation of display artifacts caused by beacon signals. To synchronize with a capacitive pen, the input-display device transmits a beacon signal via sensing electrodes. The transmission of the beacon signal can cause a display artifact on a displayed image. When the display is frequently updated (e.g., at high image frame rate), the display artifact may not be detectable by a human user. On the other hand, when the image frame rate has an equal or lower frequency than the beacon signal rate, the display artifact caused by the beacon signal can be detected.

One or more embodiments are directed to minimizing the effects of display artifacts caused by beacon signals by synchronizing between proximity sensing controller and the display driver. In some embodiments, the beacon signal is transmitted during a non-refresh period of the display. In such a scenario, either the display driver synchronizes the display update at a different time than the beacon signal is transmitted, or the proximity sensing controller transmits the beacon signal at a different time than the display update. For example, either the display driver or the proximity sensing controller may delay the respective action, (i.e., display update or beacon signal) by a time period after the vertical synchronization (Vsync) signal. A Vsync signal is a signal that is transmitted after the entire display frame is transferred. The Vsync signal indicates that an entire display frame is transmitted. Because, in such embodiments, the beacon signal is not transmitted at the same time as the display update, the display artifact is mitigated by not existing.

In other embodiments, which may be combined with the above technique, the system performs a transition to frame skip operation. In the transition to frame skip operation, an additional display refresh is performed before entering a non-refresh period and after the beacon signal is transmitted. In such embodiments, the beacon signal may still cause a display artifact. However, the minimization of the display artifact is achieved because the display is quickly refreshed prior to the period in which the display is not refreshed.

Figure 1A:
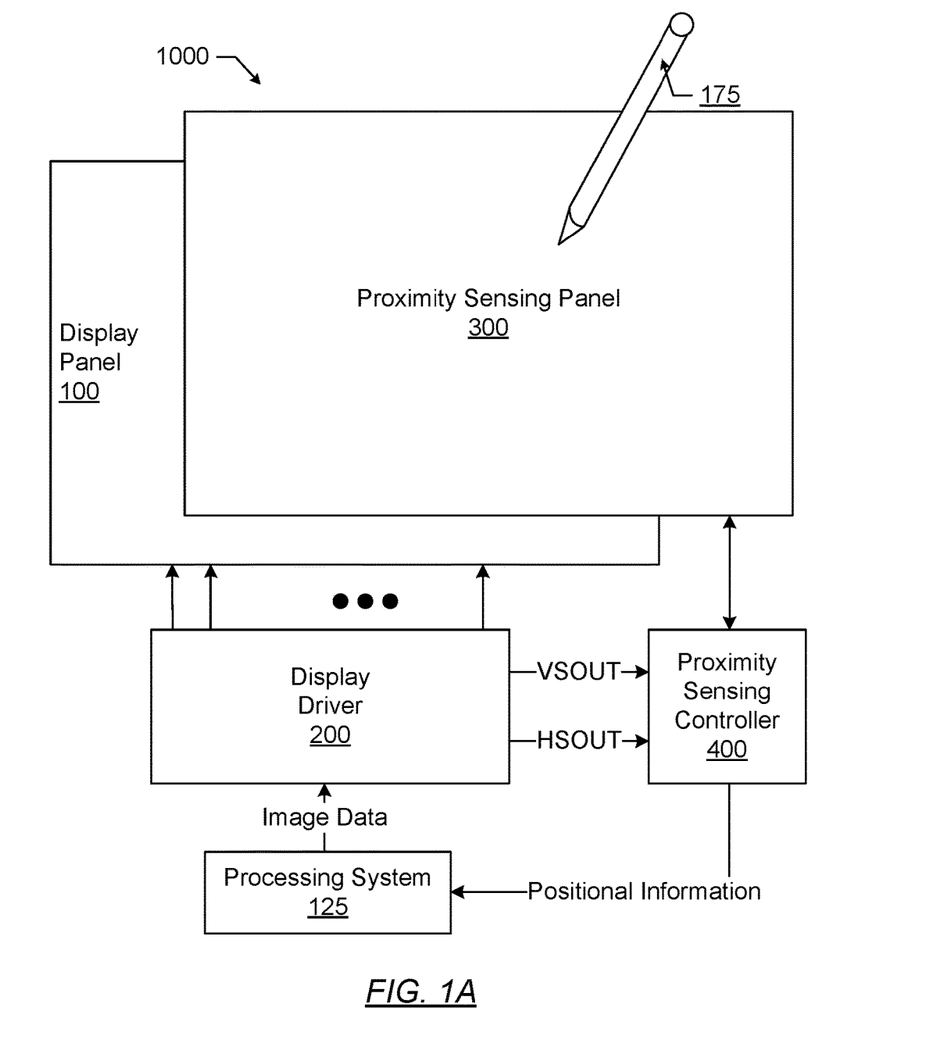
FIG. 1A shows an example configuration of an input-display device, according to one or more embodiments.

Turning to the figures, FIG. 1A shows a diagram of a system in accordance with one or more embodiments. Specifically, FIG. 1A shows a diagram of an input-display device (1000). Input-display devices, such as shown in FIG. 1A, are adapted to both image displaying and proximity sensing. An input device refers to at least an input portion of the input-display device. Input-display devices are often used as user-interfaces of electronic systems. The term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Other examples include automotive user interfaces configured to give drivers user interface capabilities. An input-display device may include a display panel (100) and a proximity sensing panel (300) having sensor electrodes disposed neighboring or integrated in the display panel (100). The input-display device (1000) may be configured to display an image on the display panel (100) while sensing one or more input objects located on or near the display panel (100) based on resulting signals received from the sensor electrodes.

Figure 1B:
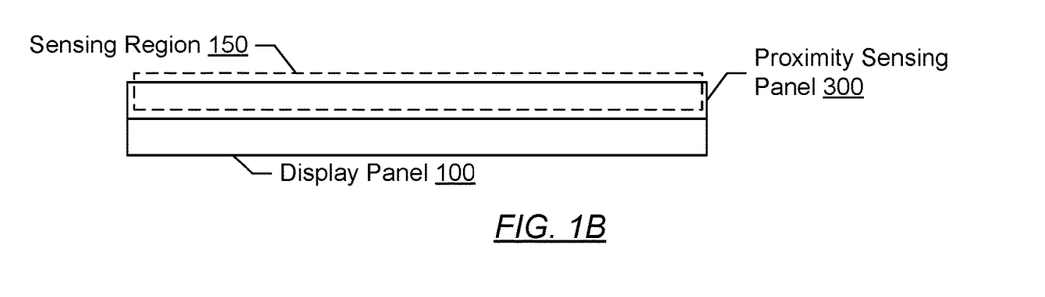
FIG. 1B shows an example side view of the input-display device, according to one or more embodiments.

In addition to the display panel (100) and proximity sensing panel (300), the input-display device (1000) includes a display driver (200) and a proximity sensing controller (400). The display panel (100) is coupled to the display driver (200), and the proximity sensing panel (300) is coupled to the proximity sensing controller (400). The display driver (200) and the proximity sensing controller (400) are further coupled to a processing system (125). Examples of the processing system (125) include an application processor, a central processing unit (CPU), a special purpose processor, and other types of processors. Although shown skewed in FIG. 1A, as shown in FIG. 1B, the proximity sensing panel (300) is disposed on or near the display panel (100) and at least partially overlapping the display panel (100). The proximity sensing panel (300) defines the sensing region (150) where input objects may be detected.

Returning to FIG. 1A, one type of input object is a capacitive pen (175) (i.e., stylus or active pen). The capacitive pen (175) transmits the capacitive pen signals responsive to the capacitive pen (175) detecting a beacon signal from the input-display device. The capacitive pen signals are signals that originate from the capacitive pen (175) and alter the capacitance detected by the proximity sensing panel (300). An example of a capacitive pen (175) is an active pen that complies with the Universal Stylus Initiative (USI) protocol.

Figure 2:
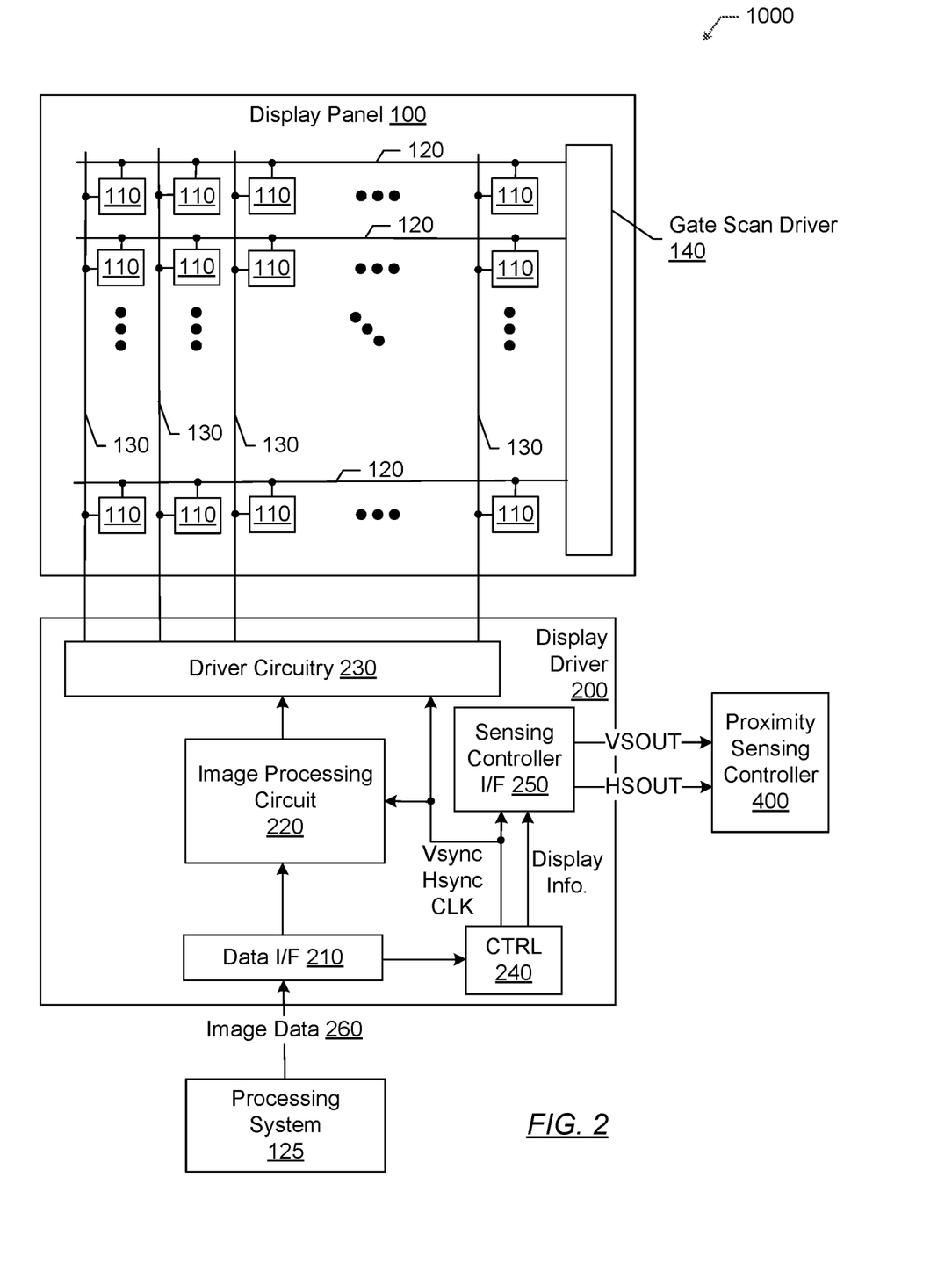
FIG. 2 shows an example configuration of a display panel, according to one or more embodiments.

FIG. 2 shows an example configuration of the display panel (100), according to one or more embodiments. The display panel (100) may be any type of dynamic display capable of displaying a visual interface to a user. Examples of the display panel (100) include organic light emitting diode (OLED) display panels, micro light emitting diode (LED) display panels and liquid crystal display (LCD) panels. In the shown embodiment, the display panel (100) includes display elements (110) (e.g., pixel circuits), gate lines (120) (also referred to as scan lines), source lines (130) (also referred to as data lines), and a gate scan driver (140). Each display element (110) may include an OLED pixel, a micro LED pixel, an LCD pixel, or a different type of pixel. Each display element (110) is coupled to the corresponding gate line (120) and source line (130). The source lines (130) may be configured to provide data voltages to display elements (110) of the display panel (100) to update (or program) the display elements (110) with the data voltages. The gate lines (120) are used to select rows of display elements (110) to be updated with the data voltages. Thus, when display elements (110) of a selected row is to be updated, the gate scan driver (140) asserts the gate line (120) coupled to the display elements (110) of the selected row. The source lines (130) may each have a significant capacitance since the source lines (130) almost traverse the display panel (100) in the vertical direction.

The display panel (100) may further include other components and signal lines depending on the display technology. In embodiments where an OLED display panel is used as the display panel (100), for example, the display panel (100) may further include emission lines that control light emission of the display elements (110) and power lines that delivers a power supply voltage to the respective display elements (110).

The display driver (200) is configured to drive the source lines (130) of the display panel (100) based on image data (260) received from the processing system (125). The image data corresponds to an image to be displayed on the display panel (100). The image data may include gray levels of the respective display elements (110) of the display panel (100). The display driver (200) is configured to generate data voltages for the respective display elements (110) based on the image data received from the processing system (125) and provide the generated data voltages to the respective display elements (110) via the source lines (130). The display driver (200) includes a data interface (I/F) (210), an image processing circuit (220), driver circuitry (230), a controller (CTRL) (240), and a proximity sensing controller interface (I/F) (250).

The data interface (210) is configured to receive image data (260) from the processing system (125) and forward the image data (260) to the image processing circuit (220). The image processing circuit (220) may be configured to perform image processing to adjust the image, such as adjust luminance of individual pixels in the image data to account for information about the pixel circuits and the display panel. The driver circuitry (230) is configured to drive the source lines (130) based on the processed image data from the image processing circuit (220).

The controller (240) is configured to receive configuration information from the processing system (125) via the data interface (210). For example, the configuration information may include the image refresh rate that identifies the rate at which the display is to be updated in accordance with one or more embodiments. The controller (240) is configured to output a Vsync signal, horizontal synchronization (Hsync), and a clock (CLK) signal. The Vsync signal is a trigger for the start of each Vsync period. The Hsync signal is a trigger for the start of each Hsync period. Additionally, the controller (240) outputs display information (info.). The image processing circuit (220), driver circuitry (230), and sensing controller interface (I/F) (250) receive the Vsync, Hsync, and clock signal, while the sensing controller interface (250) also receives the display information. The display information may include the display configuration including the current display frame rate.

The sensing controller interface (250) is an interface that is connected to the proximity sensing controller (400) and is configured to transmit on the VSOUT and HSOUT link to the proximity sensing controller (400). The VSOUT link is a connection that transmits the Vsync signal and the HSOUT link is a connection that transmits the Hsync signal. In some embodiments, the sensing controller also output the current display frame rate to the proximity sensing controller (400).

Figure 3:
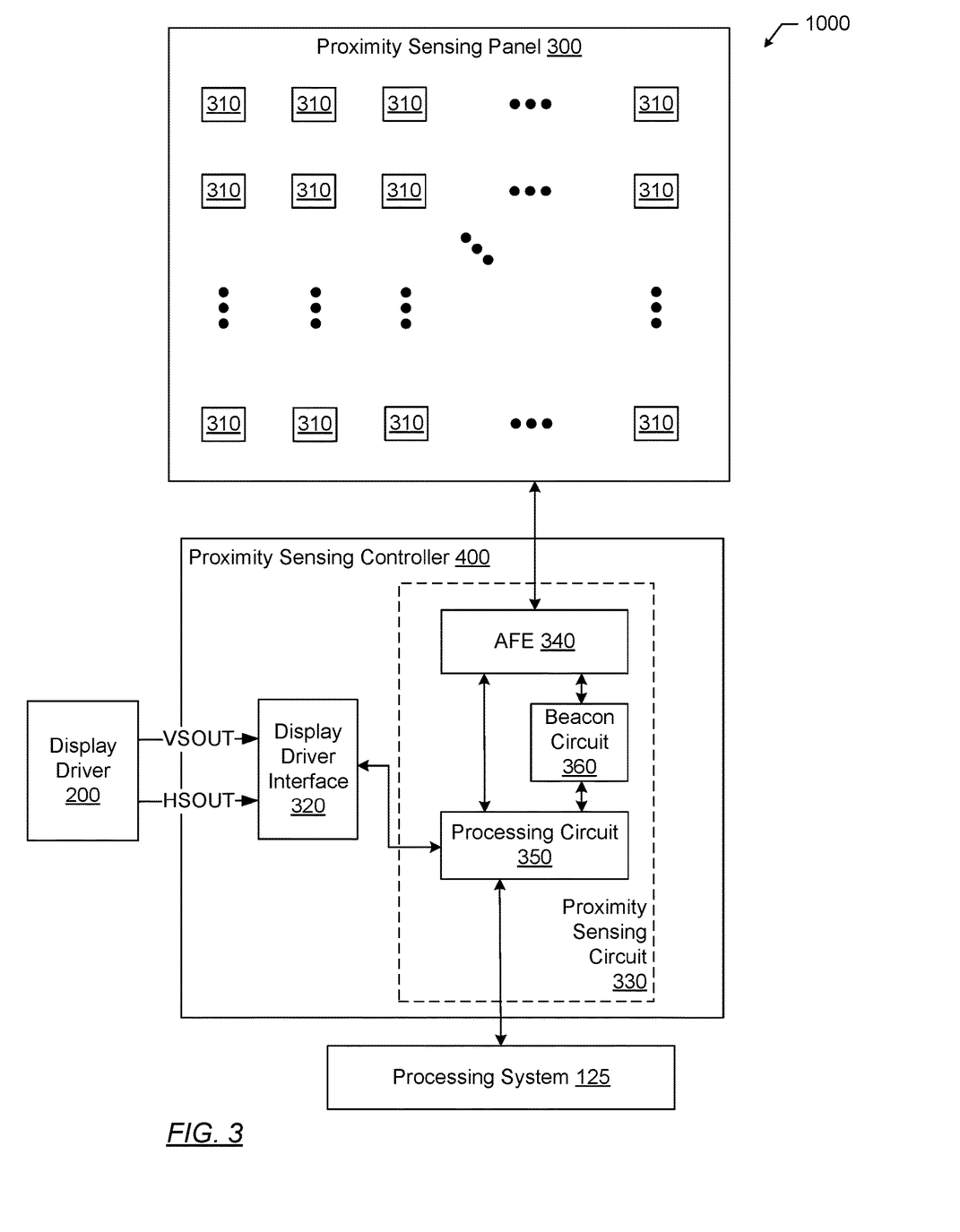
FIG. 3 shows an example configuration of a proximity sensing panel, according to one or more embodiments.

FIG. 3 shows an input device portion of an input-display device. In the shown embodiment, the proximity sensing panel (300) includes an array of sensor electrodes (310) disposed over the display panel (100). The sensor electrodes (310) are used for proximity sensing to detect one or more input objects located on or near the proximity sensing panel (300). As used herein, proximity sensing includes touch sensing (e.g., contact on the proximity sensing panel (300) and/or the display panel (100). Examples of input objects include user's fingers and styli, including capacitive pens. While twelve sensor electrodes (310) are shown in FIG. 3, the proximity sensing panel (300) may include more or less than twelve sensor electrodes (310). Further, while FIG. 3 shows the sensor electrodes (310) are rectangular, the sensor electrodes (310) may be shaped in a different shape, such as triangular, square, rhombic, hexagonal, irregular, or other shapes. Further, sensor electrodes may be configured in a variety of different configuration patterns, including bars that span vertically and/or horizontally across the panel.

The proximity sensing controller (400) is configured to sense one or more input objects based on resulting signals received from the sensor electrodes (310) and generate positional information of the one or more sensed input objects. "Positional information" as used herein broadly encompasses absolute position, relative position, velocity, acceleration, and other types of spatial information. Historical data regarding one or more types of positional information may also be determined and/or stored, including, for example, historical data that tracks position, motion, or instantaneous velocity over time. The generated positional information is sent to the processing system (125).

In one or more embodiments, the proximity sensing controller (400) is configured to sense one or more input objects through capacitive proximity sensing. Some capacitive proximity sensing implementations utilize "absolute capacitance" (also often referred to as "self-capacitance") sensing methods based on changes in the capacitive coupling between the sensor electrodes (310) and an input object. In various embodiments, an input object near the sensor electrodes (310) alters the electric field near the sensor electrodes (310), thus changing the capacitive coupling. The resulting signals acquired from the sensor electrodes (310) include effects of the changes in the capacitive coupling. In one implementation, an absolute capacitance sensing method operates by modulating the sensor electrodes (310) with respect to a reference voltage, e.g., system ground, and by detecting the capacitive coupling between the sensor electrodes (310) and input objects.

Some capacitive proximity sensing implementations utilize "transcapacitance" (also often referred to as "mutual capacitance") sensing methods based on changes in the capacitive coupling between transmitter electrodes (not shown) and the sensor electrodes (310). In various embodiments, an input object near the sensor electrodes (310) alters the electric field between the transmitter electrodes and the sensor electrodes (310), thus changing the capacitive coupling. In one implementation, a transcapacitance sensing method operates by detecting the capacitive coupling between one or more transmitter electrodes and one or more sensor electrodes (310). The coupling may be reduced when an input object coupled to a system ground approaches the sensor electrodes (310). Transmitter electrodes may be modulated relative to a reference voltage, e.g., system ground. The transmitter electrodes may be a subset of the sensor electrodes (310) or separate sensor electrodes. Further, which sensor electrodes are used as transmitter electrodes and which sensor electrodes are used as receiver electrodes may change. The receiver electrodes (310) may be held substantially constant relative to the reference voltage or modulated relative to the transmitter electrodes to facilitate receipt of resulting signals.

The proximity sensing panel is further configured to operate with a capacitive pen. The capacitive pen may be a stylus that has the transmitter electrode for transcapacitance sensing. Specifically, rather than using transmitter signals from the transmitter electrodes in the input-display device, the transmitter signals originate from the capacitive pen. The sensor electrodes (310) receive resulting signals from the transcapacitive coupling with the transmitter electrode in the capacitive pen. The resulting signals may not identify positional information, but also transmit additional information, such as configuration or state information. For example, the capacitive pen may have one or more buttons that may be used by a user to control an aspect of the user interface (e.g., color used in the interface or other aspect).

In order to communicate via the transcapacitive coupling, synchronization is performed with the input device. The synchronization is in the form of a beacon signal from the sensor electrodes (310) of the proximity sensing panel that is received by the capacitive pen when the capacitive pen is in the sensing region. For example, the input device transmits the beacon signal on sensor electrodes (310) that a sensor in the tip of a capacitive pen detects. The detection circuit in the capacitive pen uses the body of the capacitive pen as a reference. Responsive to the beacon signal, the capacitive pen transmits the capacitive signals for interpretation by the proximity sensing controller. Because the capacitive pen may be randomly removed from the sensing region, the beacon signal is repetitively transmitted. For example, the beacon signal may be transmitted at a defined rate, such as once every 16.6 milliseconds. The rate of transmission of the beacon signal is the beacon signal rate.

As the source lines of the display panel may extend to almost traverse the display panel, a capacitive coupling may exist between the source lines and sensor electrodes disposed neighboring or integrated in the display panel. The capacitive coupling between the source lines and the sensor electrodes may cause electromagnetic interference during an image refresh when the display elements are updated if the image refresh is performed concurrently with the sensor electrodes being driven with the beacon signal. The electromagnetic interference may result in a display artifact. A display artifact is a distortion in the image being displayed.

Continuing with the proximity sensing controller (400), the proximity sensing controller (400) includes a display driver interface (320) connected to a proximity sensing circuit (330). In one or more embodiments, the display driver interface (320) is a general purpose I/O interface (GPIO) that is connected to the VSOUT link and HSOUT link from the display driver (200). The display driver interface (320) is configured to communicate with a processing circuit (350) in the proximity sensing circuit (330).

In one or more embodiments, the proximity sensing circuit (330) includes an analog front end (AFE) (340), a processing circuit (350), and a beacon circuit (360). The AFE (340) is configured to receive resulting signals from the sensor electrodes (310) and generate analog-to-digital conversion (ADC) data corresponding to the resulting signals. Generating the ADC data may include conditioning (filtering, baseline compensation, and/or other analog processing) of the resulting signals and analog-to-digital conversion of the conditioned resulting signals. In embodiments where the resulting signals from the sensor electrodes (310) are acquired in a time divisional manner, the AFE (340) may be configured to provide guarding voltage Vguard to sensor electrodes (310) from which resulting signals are not currently acquired. In embodiments where the proximity sensing is achieved through transcapacitive sensing from the transmitter electrodes in the proximity sensing panel (300), the AFE (340) may be configured to provide transmitter signals to the transmitter electrodes. The operation of the AFE (340) may be controlled based on one or more register values received from the processing circuit (350) and beacon circuit (360).

When a capacitive pen is not present, the AFE is configured to drive the sensor electrodes with capacitive sensing signals, and receive resulting signals from the sensor electrodes, whereby the resulting signals result from the capacitive sensing signals.

The processing circuit (350) is configured to process the resulting signals and determine a presence of an input object. The processing circuit (350) is configured to generate positional information of one or more input objects in the sensing region based on the resulting signals acquired from the sensor electrodes (310). In one implementation, the processing circuit (350) may be configured to process the ADC data, which correspond to the resulting signals acquired from the sensor electrodes (310), to generate the positional information. The processing circuit (350) may also be configured to communicate with the capacitive pen. The processing circuit (350) may include a processor, such as a micro control unit (MCU), a central processing unit (CPU) and other types of processors, and firmware. The processing circuit (350) may be further configured to control the overall operation of the proximity sensing controller (400), including controlling the AFE (340) and the beacon circuit (360).

The beacon circuit (360) is configured to trigger driving the sensor electrodes (310) through the AFE (340) with a beacon signal. In particular, the beacon circuit (360) controls the timing of the driving of the sensor electrodes (310) with the beacon signal at the beacon signal rate. The beacon circuit (360) and/or the processing circuit (350) may have a timer for delaying a beacon signal. The timer may be a hardware-based timer or a software-based timer. The amount of the delay may be controlled by the processing circuit (350) based on the Vsync signal.

Figure 5:
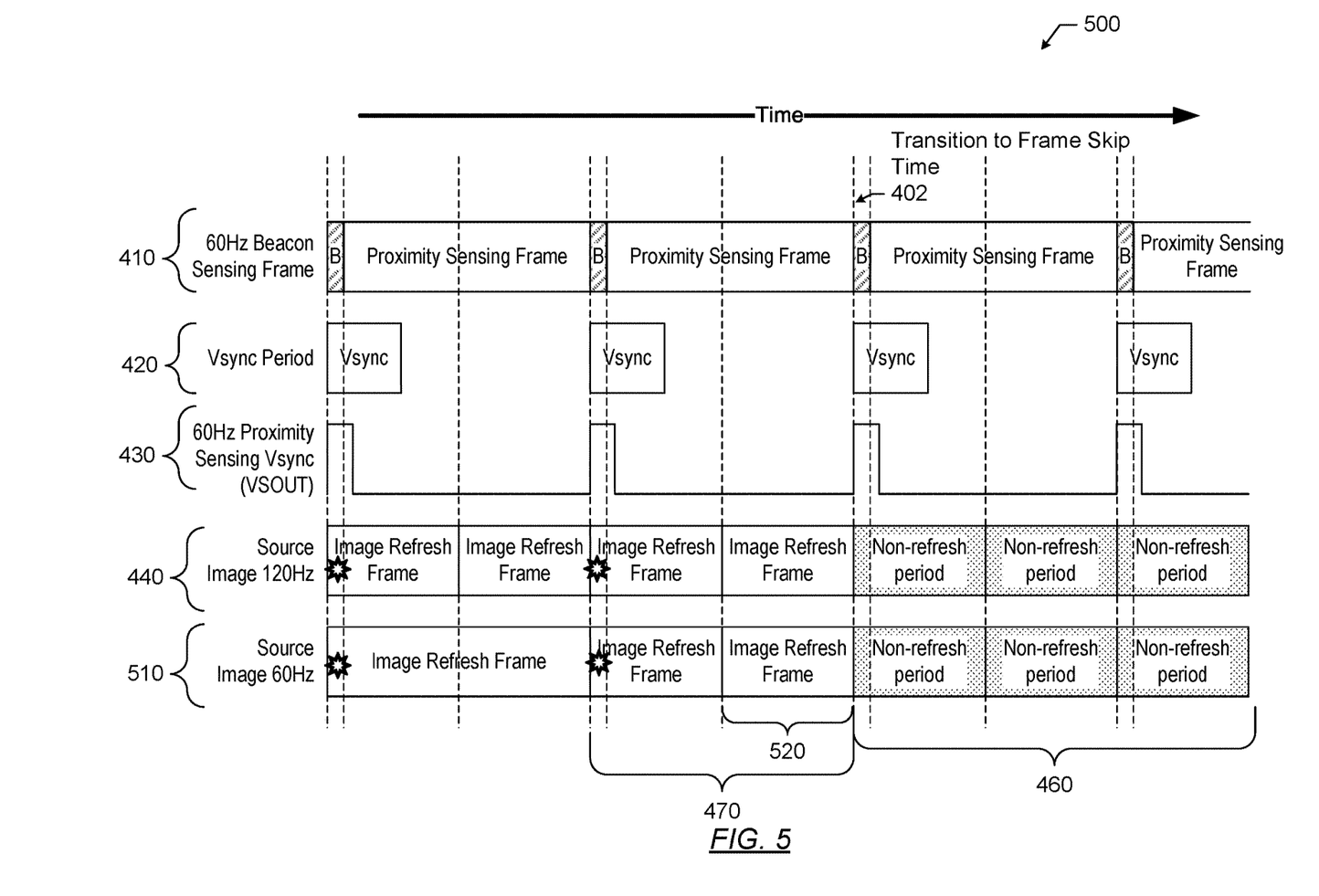
Figure 6:
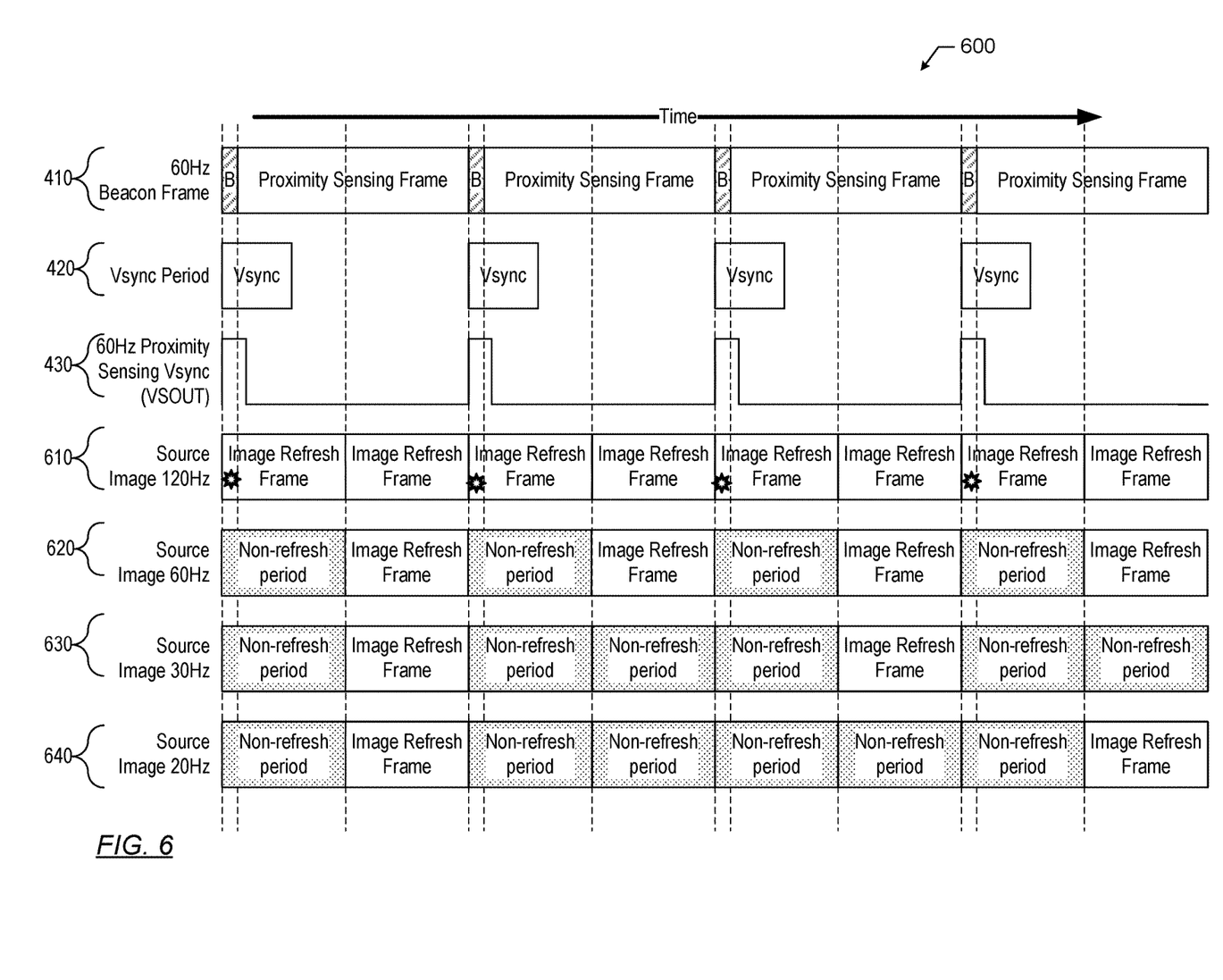
FIGS. 6 and 7 show example timing diagrams in accordance with one or more embodiments.

Different types of techniques may be used to mitigate display artifacts due to beacon signals. The timing diagrams of FIGS. 4, 5, and 6 show different ways to mitigate for display artifacts.

Figure 4:
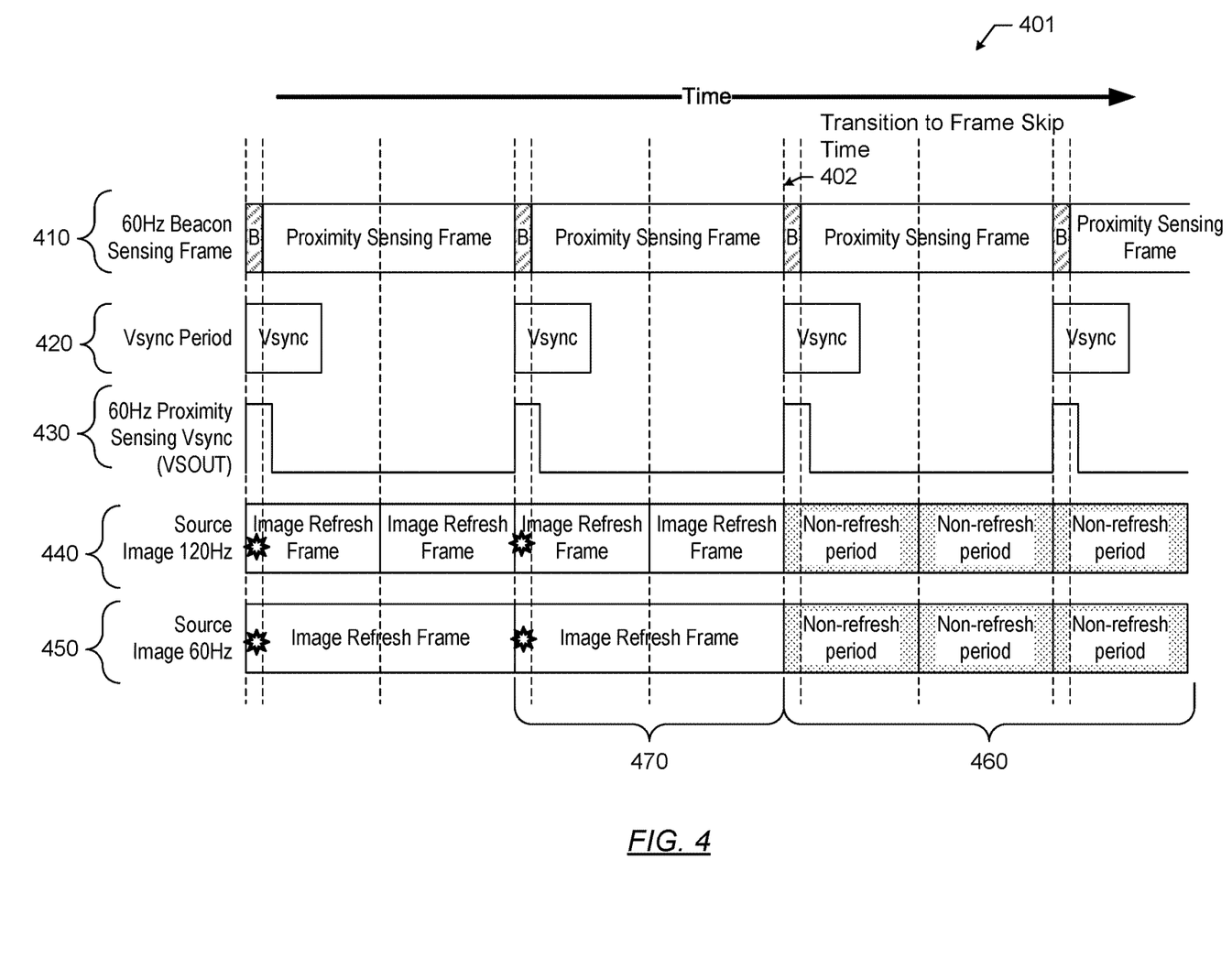
FIGS. 4 and 5 show example timing diagrams according to one or more embodiments.

FIG. 4 shows an example timing diagram (401) of how timing of the various components are triggered by a Vsync signal. The Vsync signal defines the timing of the Vsync period (420) exists on the display panel. In the example shown in FIG. 4, the Vsync period (420) is at a 60 Hertz (Hz) frequency. Although 60 Hz frequency is shown, other Vsync frequencies may be used, such as Vsync frequency like 120 Hz, 30 Hz, 20 Hz, 15 Hz ,10 Hz, 1 Hz, etc. The Vsync signal is transmitted from the controller to the image processing circuit to trigger the Vsync period (420) on the display driver. The Vsync signal is concurrently transmitted to the sensing controller interface on the display driver. Thus, the sensing controller interface outputs the Vsync signal on the VSOUT link (430) at the same frequency and concurrently to the proximity sensing controller as the Vsync period (420). The Vsync period (420) corresponds to the output of the VSOUT link (430). Additional Vsync periods may exist on the display DDI that are not output on the VSOUT link (430).

The proximity sensing controller triggers the beacon sensing frame (410) based on the Vsync signal on the VSOUT link (430).

The beacon sensing frame (410) includes a beacon signal and a proximity sensing frame. The beacon signal (denoted by B in FIG. 4) is transmitted at a defined frequency as triggered by the Vsync signal on VSOUT link (430). For example, the beacon signal may be transmitted at a 60 Hz frequency beacon sensing frame (410). Between transmissions of the beacon signal, the proximity sensing controller performs a proximity sensing frame. The proximity sensing frame may include detecting positional information for an input object and receiving data from a capacitive pen.

Continuing with FIG. 4, the timing diagram (401) shows the timings for two different image refresh rates (i.e., 120 Hz and 60 Hz). The particular rates are for example purposes only and other rates may be used, such as 30 Hz, etc. In one or more embodiments, image refresh rates are alternatives of each other as the display or portion thereof is only updated according to one refresh rate at any particular point in time. The input-display device may switch between refresh rates.

In FIG. 4, the image refresh rate relates to the time to update the display. Namely, the image refresh periods are in succession and last the duration of time as defined by the image refresh rate. Thus, the duration of time of an image refresh frame for an image refresh rate at 60 Hz is twice the duration of time of an image refresh frame for an image refresh rate at 120 Hz. Similarly, although not shown, the duration of time of an image refresh frame for an image refresh rate at 30 Hz is twice the duration of time of an image refresh frame for an image refresh rate at 60 Hz. The duration of the image refresh frame may be controlled by the length of time of the Hsync blanking periods (not shown) and the Vsync blanking periods. The lower frequencies may be performed to reduce electricity usage.

When the beacon signal is being transmitted as part of the beacon sensing frame (410), the image refresh frame may include display artifacts caused by the beacon signal as shown by the "star character" in FIG. 4. When the image refresh rate is 120 Hz (440), the display is frequently updated as compared to the beacon signal rate. In the example in which the beacon signal rate is 60 Hz and the image refresh rate is 120 Hz, only half of the image refresh frames have a display artifact. Because of the frequency of image refresh, any display artifact may not be detectable to a human user.

However, when the image refresh rate is at the lower frequency of 60 Hz (450), the same image is displayed on the display panel for a longer period of time. Further, when the image refresh rate is at the equal or lower frequency than the beacon signal rate, then each display image includes a display artifact.

Further, during the frame skip operation, the frame refresh period is replaced non-refresh period (460), and, thus, the display artifact remains because the display is not updated. At the transition to frame skip time (402), the display switches from continually updating the display to non-refresh period(s). In other words, an image refresh frame, when the display is updated, is skipped and a non-refresh period exists. The non-refresh periods are periods when the image on the display is not refreshed. Non-refresh periods may be referred to as vbias periods. During the non-refresh periods (460), the same image is displayed without update. Thus, the display artifact from the immediately preceding image refresh period (470) remains shown on the display.

Mitigating for such display artifacts may be performed using the technique shown in FIG. 5. FIG. 5 shows a timing diagram (500) for when transitioning to frame skip to mitigate for display artifacts. In the timing diagram of FIG. 5, the timings of the beacon sensing frame (410), Vsync period (420), proximity sensing Vsync on VSout (430), and the source image at 120 Hz (440) remain the same. However, the image refresh for the source image at 60 Hz (510) is modified so that the display artifact does not remain during the non-refresh period. Specifically, in the refresh period (470) immediately preceding the non-refresh periods (460), an additional image refresh frame (520) is performed. As shown in example FIG. 5, the additional image refresh frame (520) is performed when the following conditions exist. A first condition is that the image refresh rate is at an equal or lower frequency than the beacon signal rate. The second condition is that the non-refresh period occurs immediately after a next Vsync signal that causes the beacon signal. In terms of timing, the additional image refresh frame (520) is performed after the last beacon signal and before the next Vsync signal completes transmission. Therefore, the additional image refresh frame (520) does not include a display artifact. For example, directly before the transition to frame skip or the last Vsync period before the non-refresh period, the display may switch to a 120 Hz update, thereby causing the additional image refresh frame. The same technique may be used for lower frequency updates.

Another way to use less energy is to have the same duration of time for the image refresh frames but decrease the number of image refresh frames. Non-refresh periods are more frequent based on the image refresh rates. In such a scenario, FIG. 6 shows an example timing diagram (600) to mitigate for display artifacts from the beacon signal. In FIG. 6, the timings of the beacon sensing frame (410), Vsync period (420), proximity sensing Vsync on VSout (430) are the same as shown in FIG. 4 and FIG. 5. Further, the source image at 120 Hz (610) is approximately the same, but without a non-refresh period. Thus, at 120 Hz, every other frame may exhibit a display artifact.

For the image refresh rates that are equal to or have a lower frequency than the beacon frame, mitigating for display artifacts using the technique in FIG. 6 is performed by not aligning the image refresh frames with the beacon signal. Rather, the non-refresh periods are aligned with the image refresh frames. For example, the source image at 60 Hz (620) may have alternating non-refresh periods and image refresh frames as shown in FIG. 6. However, display driver delays the image refresh frame to after the Vsync period (420) and, correspondingly, after the beacon signal.

Similarly, the source image at 30 Hz (630) may have three non-refresh periods between the image refresh frames. Thus, every four periods are an image refresh frame for source image at 30 Hz (630) in the example shown in FIG. 6. Like the source image at 60 Hz, when transitioning, the display driver delays the image refresh frame to the period after the Vsync period (420) and correspondingly after the beacon signal.

At the source image at 20 Hz (640), five non-refresh periods between the image refresh frames. Thus, every six periods is an image refresh frame for source image at 20 Hz (640) in the example shown in FIG. 6. Like the source image at 60 Hz and 30 Hz, when transitioning, the display driver delays the image refresh frame to the period after the Vsync period (420) and correspondingly after the beacon signal.

Generalizing FIG. 6, if the periods at which the beacon signal is transmitted is odd periods, then the image refresh frame is delayed so that the image refresh frames are on some of the even periods.

Figure 7:
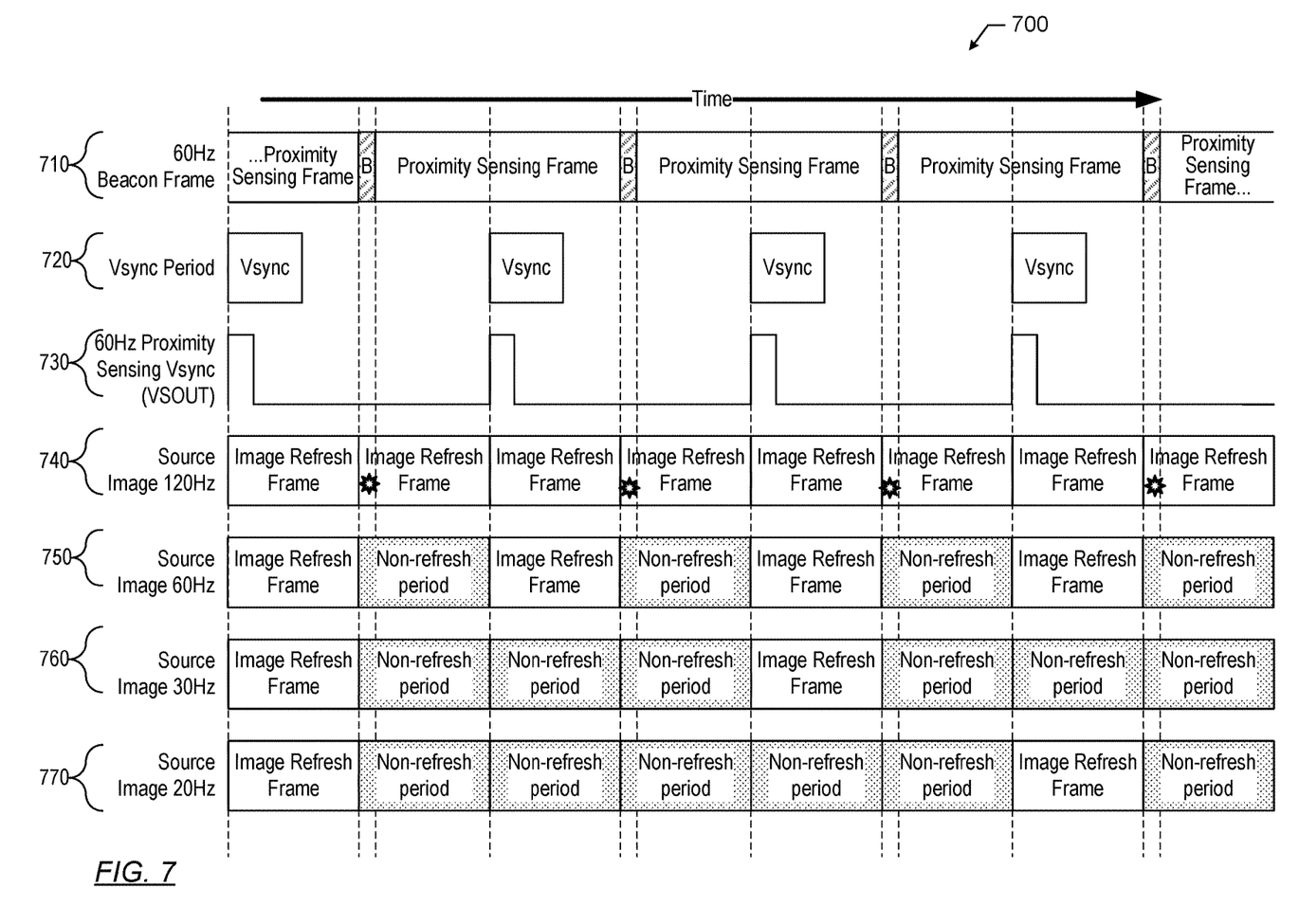

FIG. 7 shows another timing diagram (700) for mitigating for display artifacts due to the beacon signal. In FIG. 7, the beacon frame (710), Vsync period (720), proximity sensing Vsync on VSout (730), source image at 120 Hz (740), source image at 60 Hz (750), source image at 30 Hz (760), and source image at 20 Hz (770) are each similar to the beacon sensing frame (410), Vsync period (420), proximity sensing Vsync on VSout (430), source image at 120 Hz (610), source image at 60 Hz (620), source image at 30 Hz (630), and source image at 20 Hz (640), respectively, albeit with different delays. In FIG. 7, the proximity sensing controller is modified to delay the beacon signal so as to not overlap with the Vsync signal. The display driver triggers the image refresh frames based on the Vsync signal and without delay. Because the proximity sensing controller performs the delay of the beacon signal to be delayed from the Vsync signal, the image refresh frame is not overlapping with the beacon signal while the display driver operates as normal according to the image refresh rate.

Although FIGS. 4-7 show specific image refresh rates and beacon signal rates, other rates not shown may be used without departing from the scope of the claims. For example, the various embodiments may support 15 Hz, 10 Hz, and 1 Hz in one or more embodiments.

Figure 8:
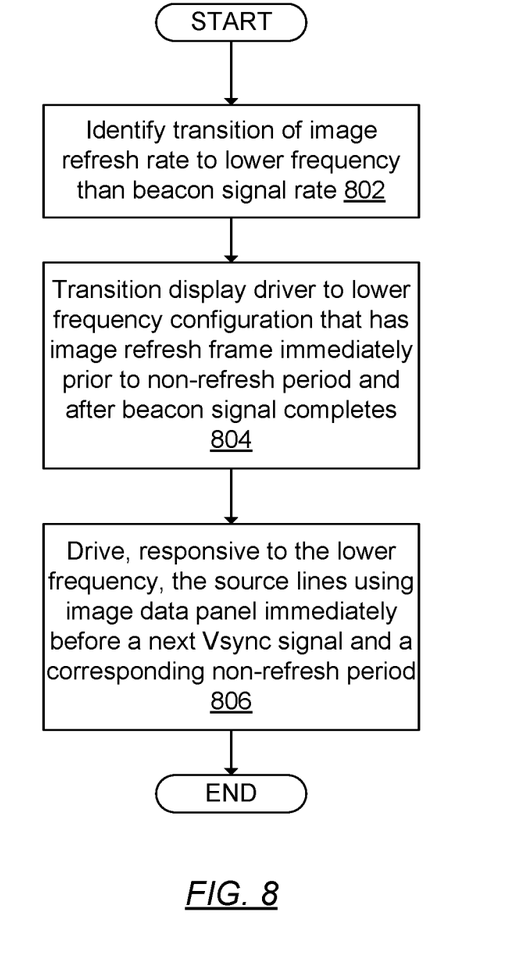
FIG. 8 shows example flowchart according to one or more embodiments.
Figure 9:
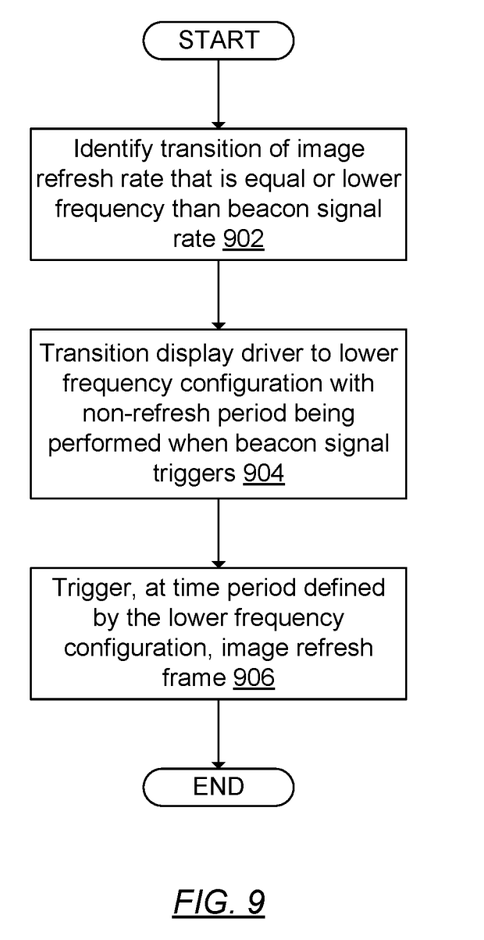
FIG. 9 shows example flowchart according to one or more embodiments.
Figure 10:
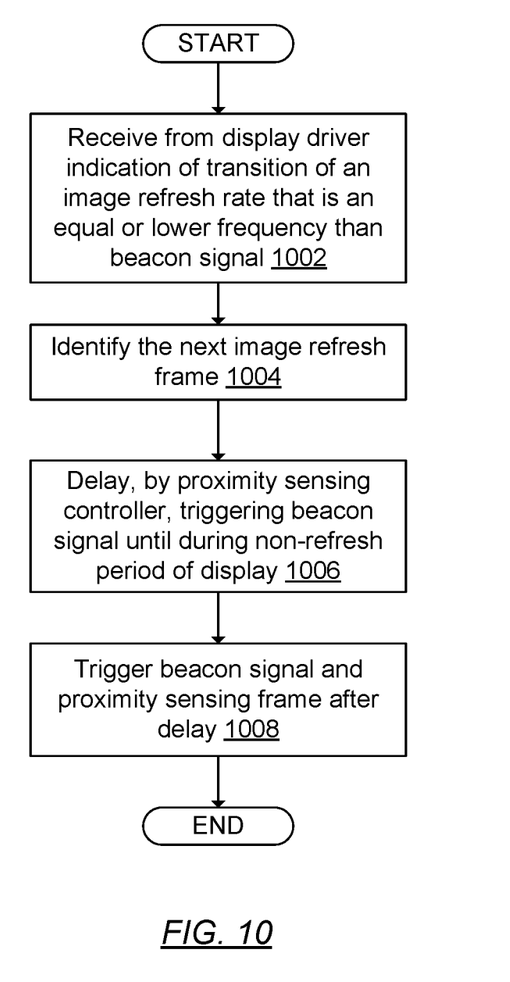
FIG. 10 shows example flowchart according to one or more embodiments.

FIGS. 8-10 show example flowcharts in accordance with one or more embodiments. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively.

FIG. 8 corresponds to the timing diagram of FIG. 5. In Block 802, the transition of the image refresh rate to a lower frequency than the beacon signal rate is identified. For example, the processing system may send an instruction to transition to a power saving mode. Responsive to the transition, the controller on the display driver may trigger the switch to a lower image refresh rate.

In Block 804, the display driver transitions to lower frequency configuration that has an additional image refresh frame immediately prior to corresponding non-refresh period and after beacon signal completes. The lower frequency configuration display driver tracks which period immediately preceding the non-refresh period and triggers the additional image refresh frame.

In Block 806, responsive to the lower frequency, the display driver drives the source lines using image data immediately before a next Vsync signal and a corresponding non-refresh period.

FIG. 9 corresponds to the timing diagram of FIG. 6. In Block 902 of FIG. 9, the transition of the image refresh rate that is equal or lower frequency than the beacon signal rate is identified. In Block 904, the display driver is transitioned to the lower frequency configuration with a non-refresh period being performed when the beacon signal triggers. In Block 906, at the time period defined by the lower frequency configuration, the image refresh frame is triggered. In the diagram of FIG. 9, image refresh frame is delayed from the Vsync signal by the display driver based on being in the lower frequency configuration. The controller, the driver circuitry, or the image processing circuit may cause the delay. The operations of the proximity sensing controller may remain unchanged.

FIG. 10 corresponds to the timing diagram of FIG. 7. FIG. 10 is from the perspective of when the proximity sensing controller delays the beacon signal and the display driver remains unchanged. In Block 1002, from the display driver, the proximity sensing controller receives an indication of an image refresh rate that is an equal or lower frequency than the beacon signal rate. The indication may be a signal transmitted from the display driver to the proximity sensing controller. In Block 1004, the next image refresh frame is identified. The next image refresh frame may be identified as being triggered by the Vsync signal.

In Block 1006, the proximity sensing controller delays triggering the beacon signal until during a non-refresh period of the display. The delay may be, for example, equivalent to have of a beacon sensing frame. After the delay, the beacon signal and the corresponding proximity sensing frame is triggered in Block 1008. Thus, in the configuration of FIG. 10, the proximity sensing controller manages the delay and the display driver does not change to mitigate for display artifacts caused by the beacon signal.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An input device comprising:
a proximity sensing panel comprising a plurality of sensor electrodes; and
a proximity sensing circuit configured to:
receive an indication of a transition of an image refresh rate to an equal or lower frequency than a beacon signal rate, and
align transmitting a beacon signal on the proximity sensing panel to a non-refresh period of a display based on the transition,
wherein the beacon signal remains aligned with a vertical synchronization (Vsync) signal.

2. The input device of claim 1, further comprising:
a display driver interface coupled to VSOUT link and configured to receive the Vsync signal from a display driver,
wherein the proximity sensing circuit comprises a beacon circuit configured to trigger the beacon signal responsive to the Vsync signal and during the non-refresh period.

3. The input device of claim 1, wherein the proximity sensing circuit aligns the transmitting the beacon signal by delaying transmitting the beacon signal to the non-refresh period.

4. The input device of claim 3, wherein the proximity sensing circuit is configured to determine an amount of the delay based on a Vsync signal from a display driver.

5. The input device of claim 1, the proximity sensing circuit comprising:
an analog front end configured to:
receive capacitive pen signals from the plurality of sensor electrodes,
the capacitive pen signals being responsive to the beacon signal,
a processing circuit configured to process the capacitive pen signals.

6. The input device of claim 1, the proximity sensing circuit comprising:
an analog front end configured to:
drive the plurality of sensor electrodes with capacitive sensing signals; and
receive resulting signals from the plurality of sensor electrodes,
a processing circuit configured to process the resulting signals and determine a presence of an input object.

7. The input device of claim 1, wherein the indication of the transition is received from a display driver.

8. The input device of claim 1, wherein the beacon signal is transmitted at a 60 Hertz (Hz) frequency and the image refresh rate is a 60 Hz, 30 Hz, or 20 Hz frequency.

9. An input-display device comprising:
a display panel comprising a plurality of source lines;
a proximity sensing panel comprising a plurality of sensor electrodes capacitively coupled to the source lines, the sensor electrodes configured to output a beacon signal; and
a display driver configured to:
determine that an image refresh rate is an equal or lower frequency than a beacon signal rate, and
perform, responsive to the equal or lower frequency, an additional image refresh frame on the display panel immediately before a next vertical synchronization (Vsync) signal and a corresponding non-refresh period,
wherein the beacon signal is aligned with the next Vsync signal.

10. The input-display device of claim 9, wherein performing the additional image refresh frame comprises driving the plurality of source lines with image data.

11. The input-display device of claim 9, wherein performing the additional image refresh frame comprises switching to a higher image refresh rate than the image refresh rate immediately prior to the next Vsync signal.

12. The input-display device of claim 9, wherein the display driver is further configured to:
identify a transition of an image refresh rate to the equal or lower frequency than the beacon signal rate, and
transition the display driver to a lower frequency configuration that comprises the additional image refresh frame immediately prior to a corresponding non-refresh period.

13. The input-display device of claim 9, further comprising:
  a proximity sensing circuit configured to:
    transmit the beacon signal on the proximity sensing panel,
    receive capacitive pen signals from the plurality of sensor electrodes, the capacitive pen signals being responsive to the beacon signal, and
    process the active pen signals.

14. The input-display device of claim 13, further comprising:
  the proximity sensing circuit configured to:
    drive the plurality of sensor electrodes with capacitive sensing signals,
    receive resulting signals from the plurality of sensor electrodes, and
    process the resulting signals and determine a presence of an input object.

15. The input-display device of claim 14, wherein the beacon signal is transmitted at a 60 Hertz (Hz) frequency and the image refresh rate is a 60 Hz, 30 Hz, or 20 Hz frequency.

16. An input-display device comprising:
  a display panel comprising a plurality of source lines;
  a proximity sensing panel comprising a plurality of sensor electrodes capacitively coupled to the source lines, the sensor electrodes configured to output a beacon signal; and
  a display driver configured to:
    determine that an image refresh rate is an equal or lower frequency than a beacon signal rate, and
    align a non-refresh period with transmitting the beacon signal on the proximity sensing panel based on the equal or lower frequency,
    wherein the beacon signal remains aligned with a vertical synchronization (Vsync) signal.

17. The input-display device of claim 16, further comprising:
  a proximity sensing circuit connected to the proximity sensing panel and comprising:
    a display driver interface connected to a VSOUT link and configured to receive the Vsync signal from the display driver, and
    a beacon circuit configured to trigger the beacon signal responsive to the Vsync signal and during the non-refresh period.

18. The input-display device of claim 16, wherein the display driver aligns the transmitting of the beacon signal by delaying an image refresh frame by a period after the Vsync signal.

19. The input-display device of claim 16, further comprising:
  the proximity sensing circuit comprising:
    an analog front end configured to:
      receive capacitive pen signals from the plurality of sensor electrodes, the capacitive pen signals being responsive to the beacon signal, and
    a processing circuit configured to process the capacitive pen signals.

20. The input-display device of claim 16, wherein the beacon signal is transmitted at a 60 Hertz (Hz) frequency and the image refresh rate is one selected from a group consisting of a 60 Hz, 30 Hz, or 20 Hz frequency.

* * * * *